(12) United States Patent
Dantuluri et al.

(10) Patent No.: US 12,430,514 B2
(45) Date of Patent: Sep. 30, 2025

(54) SYSTEM FOR MACHINE LEARNING BASED NETWORK SESSION INTERACTION

(71) Applicant: BANK OF AMERICA CORPORATION, Charlotte, NC (US)

(72) Inventors: Indradeep Dantuluri, Harrisburg, NC (US); Pavan Chayanam, Alamo, CA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 280 days.

(21) Appl. No.: 17/963,330

(22) Filed: Oct. 11, 2022

(65) Prior Publication Data

US 2024/0119237 A1  Apr. 11, 2024

(51) Int. Cl.
*G06F 40/35* (2020.01)
*G06F 40/20* (2020.01)
*G06N 5/022* (2023.01)

(52) U.S. Cl.
CPC .............. *G06F 40/35* (2020.01); *G06F 40/20* (2020.01); *G06N 5/022* (2013.01)

(58) Field of Classification Search
CPC ................................ G06F 40/35; G06F 40/20
See application file for complete search history.

(56) References Cited

U.S. PATENT DOCUMENTS

| | | | |
|---|---|---|---|
| 9,632,870 B2 | 4/2017 | Bennett | |
| 10,157,442 B1 | 12/2018 | Mostak | |
| 11,763,265 B2 * | 9/2023 | Vaananen | G06N 20/00 705/7.18 |
| 2013/0208103 A1 * | 8/2013 | Sands | H04N 21/42201 726/16 |
| 2017/0091670 A1 | 3/2017 | Gulin | |
| 2017/0193389 A1 | 7/2017 | Thomas | |
| 2017/0220949 A1 | 8/2017 | Feng | |
| 2017/0249729 A1 | 8/2017 | Greene | |
| 2017/0344910 A1 | 11/2017 | Wu | |
| 2018/0025024 A1 | 1/2018 | Tiwari | |
| 2018/0081562 A1 | 3/2018 | Vasudevan | |
| 2018/0113746 A1 | 4/2018 | Lopez | |
| 2018/0181632 A1 | 6/2018 | Zarum | |
| 2018/0181877 A1 | 6/2018 | Wu | |
| 2018/0189674 A1 | 7/2018 | Hillard | |
| 2018/0293490 A1 | 10/2018 | Ma | |
| 2018/0314603 A1 | 11/2018 | Gibbons, Jr. | |
| 2018/0315158 A1 | 11/2018 | Nurvitadhi | |
| 2018/0315499 A1 | 11/2018 | Appelbaum | |
| 2018/0357019 A1 | 12/2018 | Karr | |
| 2018/0359544 A1 | 12/2018 | Sagie | |
| 2019/0004737 A1 | 1/2019 | Khan | |
| 2019/0095925 A1 * | 3/2019 | Gabriele | G06Q 20/40145 |

(Continued)

*Primary Examiner* — Bryan S Blankenagel
(74) *Attorney, Agent, or Firm* — Moore & Van Allen PLLC; Anup Iyer

(57) ABSTRACT

Systems, computer program products, and methods are described herein for machine learning based network session interaction. The present disclosure is configured to receive, from an end-point device, a user input, wherein the user input comprises natural language data; extract a first set of attributes associated with the user input; determine, using a machine learning (ML) subsystem, a first set of adaptive response actions to the user input based on the first set of attributes; and execute the first set of adaptive response actions.

16 Claims, 6 Drawing Sheets

(56) References Cited

U.S. PATENT DOCUMENTS

| | | | |
|---|---|---|---|
| 2019/0361575 A1* | 11/2019 | Ni | H04L 67/12 |
| 2023/0135962 A1* | 5/2023 | Lee | G06F 40/216 |
| | | | 704/9 |
| 2023/0259883 A1* | 8/2023 | Misler | G06N 5/022 |
| | | | 705/321 |
| 2023/0410191 A1* | 12/2023 | Swaminathan | G06Q 40/02 |

* cited by examiner

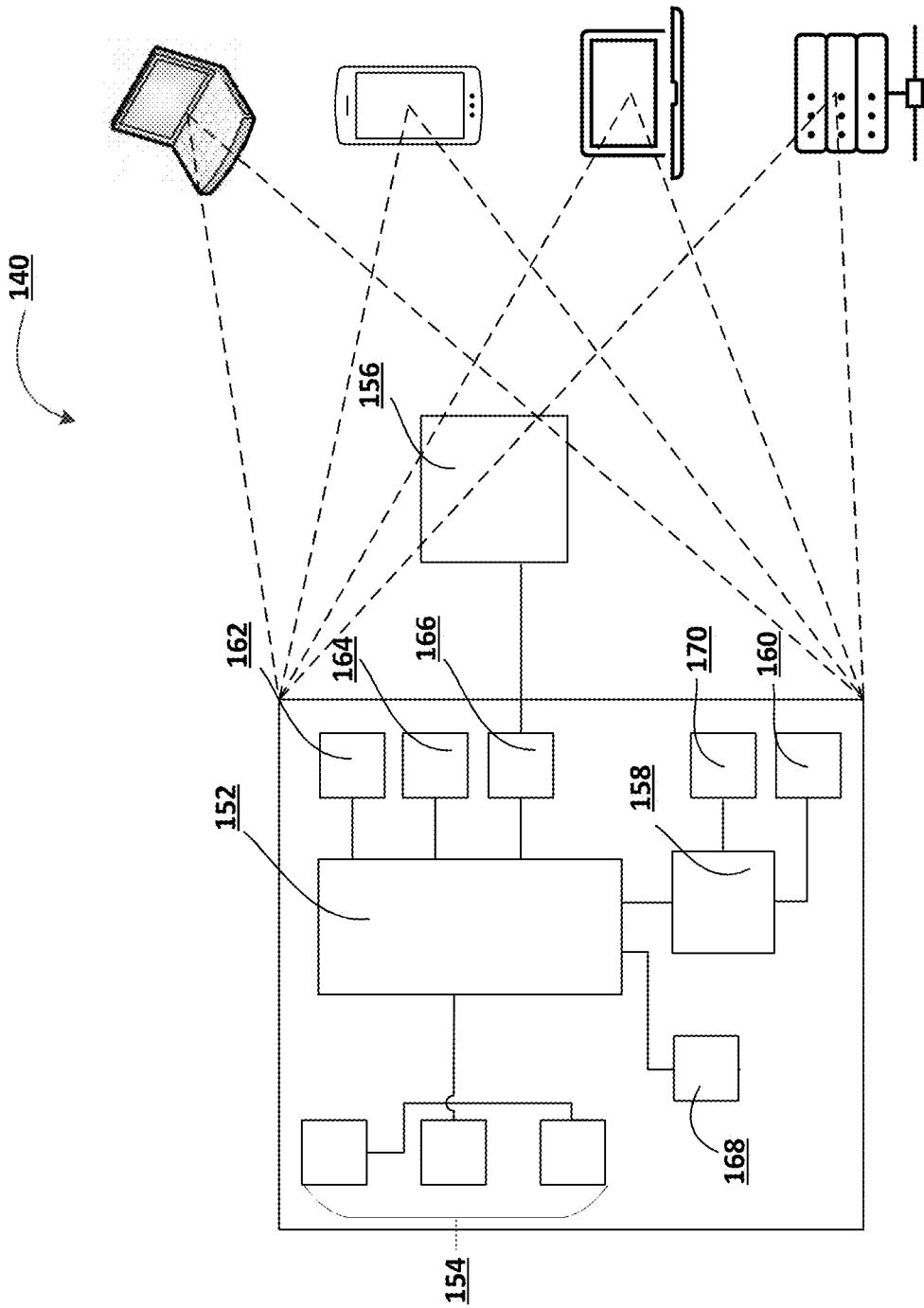

SYSTEM FOR MACHINE LEARNING BASED NETWORK SESSION INTERACTION

TECHNOLOGICAL FIELD

Example embodiments of the present disclosure relate to machine learning based network session interaction.

BACKGROUND

Data management is the process of ingesting, storing, organizing, and maintaining the data created and collected by an entity. Effective data management is crucial when providing analytical information to help drive operations.

Applicant has identified a number of deficiencies and problems associated with data management within the scope of a network session interaction. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for machine learning based network session interaction.

In one aspect, a system for machine learning based network session interaction is provided. The system comprising: a non-transitory storage device; and a processor coupled to the non-transitory storage device, wherein the processor is configured to: receive, from an end-point device, a user input, wherein the user input comprises natural language data; extract a first set of attributes associated with the user input; determine, using a machine learning (ML) subsystem, a first set of adaptive response actions to the user input based on the first set of attributes; and execute the first set of adaptive response actions.

In some embodiments, in determining the first set of adaptive response actions, the processor is further configured to: deploy, via the ML subsystem, a first trained ML model on the first set of attributes; and determine, using the first trained ML model, the first set of adaptive response actions.

In some embodiments, wherein the processor is further configured to: retrieve, from a first data repository, one or more attributes and one or more adaptive response actions executed in response to the one or more attributes; generate a first feature set comprising the one or more attributes and the one or more adaptive response actions; and train, using the ML subsystem, an ML model using the first feature set to generate the first trained ML model.

In some embodiments, the first set of adaptive response actions comprises an end-point device modification action.

In some embodiments, in executing the end-point device modification action, the processor is further configured to: establish a permissioned access with the end-point device; and trigger the end-point device modification action on the end-point device to modify at least one computing setting on the end-point device.

In some embodiments, the at least one computing setting is a hardware setting or a software setting.

In some embodiments, the processor is further configured to: determine, using the ML subsystem, a first set of categories for the user input based on at least the first set of attributes; and classify the user input into the first set of categories.

In some embodiments, in determining the first set of categories of the user input, the processor is further configured to: deploy, via the ML subsystem, a second trained ML model on the first set of attributes; classify, using the second trained ML model, the user input into the first set of categories; and record the user input in one or more databases associated with the first set of categories.

In some embodiments, the processor is further configured to: receive, from a second data repository, one or more attributes and one or more categories associated with the one or more attributes; generate a second feature set comprising the one or more attributes and the one or more categories; and train, using the ML subsystem, an ML model using the second feature set to generate the second trained ML model.

In some embodiments, the user input comprises user experience feedback information associated with a network interaction with a computing environment managed by an entity.

In another aspect, a computer program product for machine learning based network session interaction is provided. The computer program product comprising a non-transitory computer-readable medium comprising code causing an apparatus to: receive, from an end-point device, a user input, wherein the user input comprises natural language data; extract a first set of attributes associated with the user input; determine, using a machine learning (ML) subsystem, a first set of adaptive response actions to the user input based on the first set of attributes; and execute the first set of adaptive response actions.

In yet another aspect, a method for machine learning based network session interaction is provided. The method comprising: receiving, from an end-point device, a user input, wherein the user input comprises natural language data; extracting a first set of attributes associated with the user input; determining, using a machine learning (ML) subsystem, a first set of adaptive response actions to the user input based on the first set of attributes; and executing the first set of adaptive response actions.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
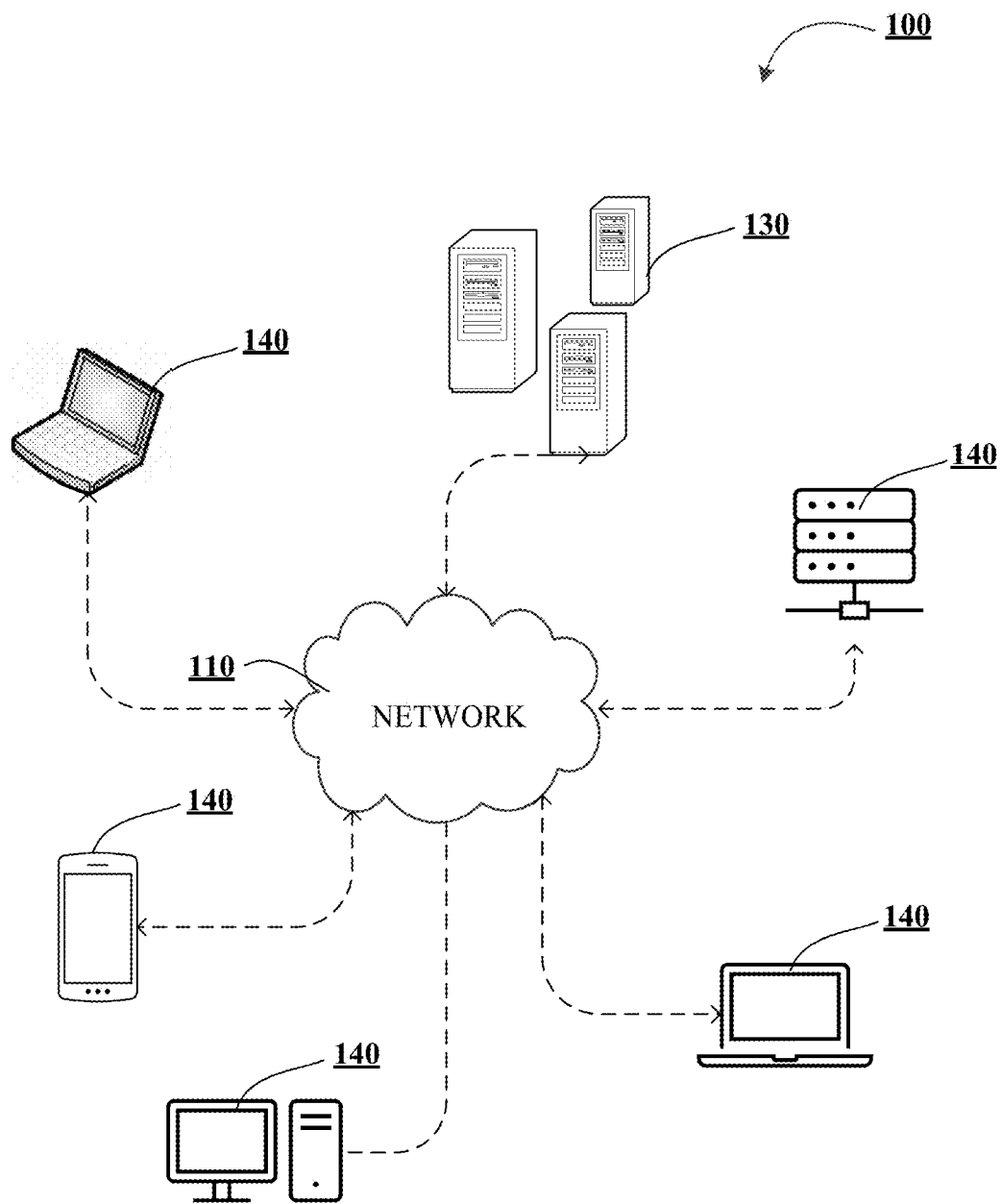
Figure 1B:
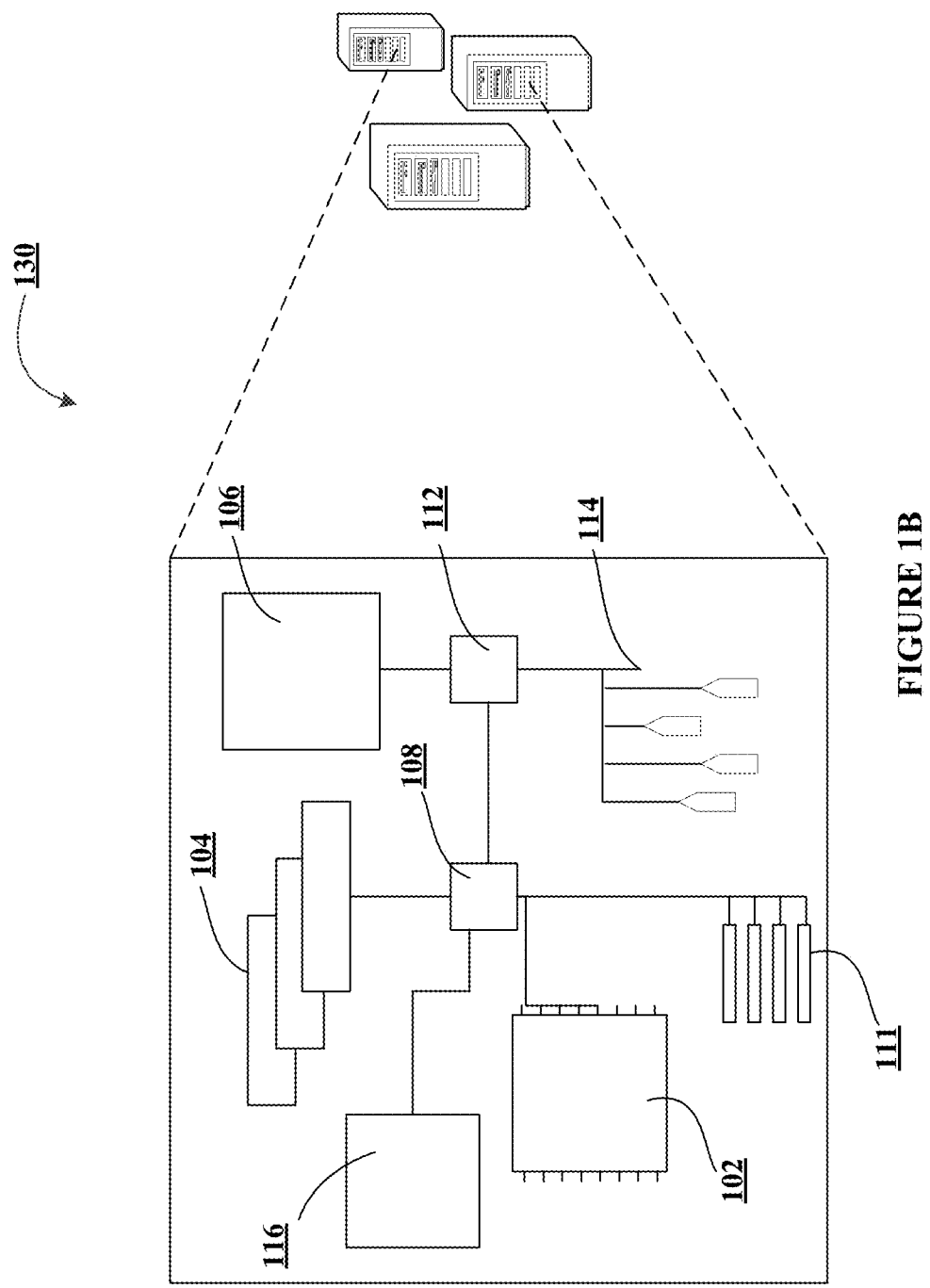
Figure 2:
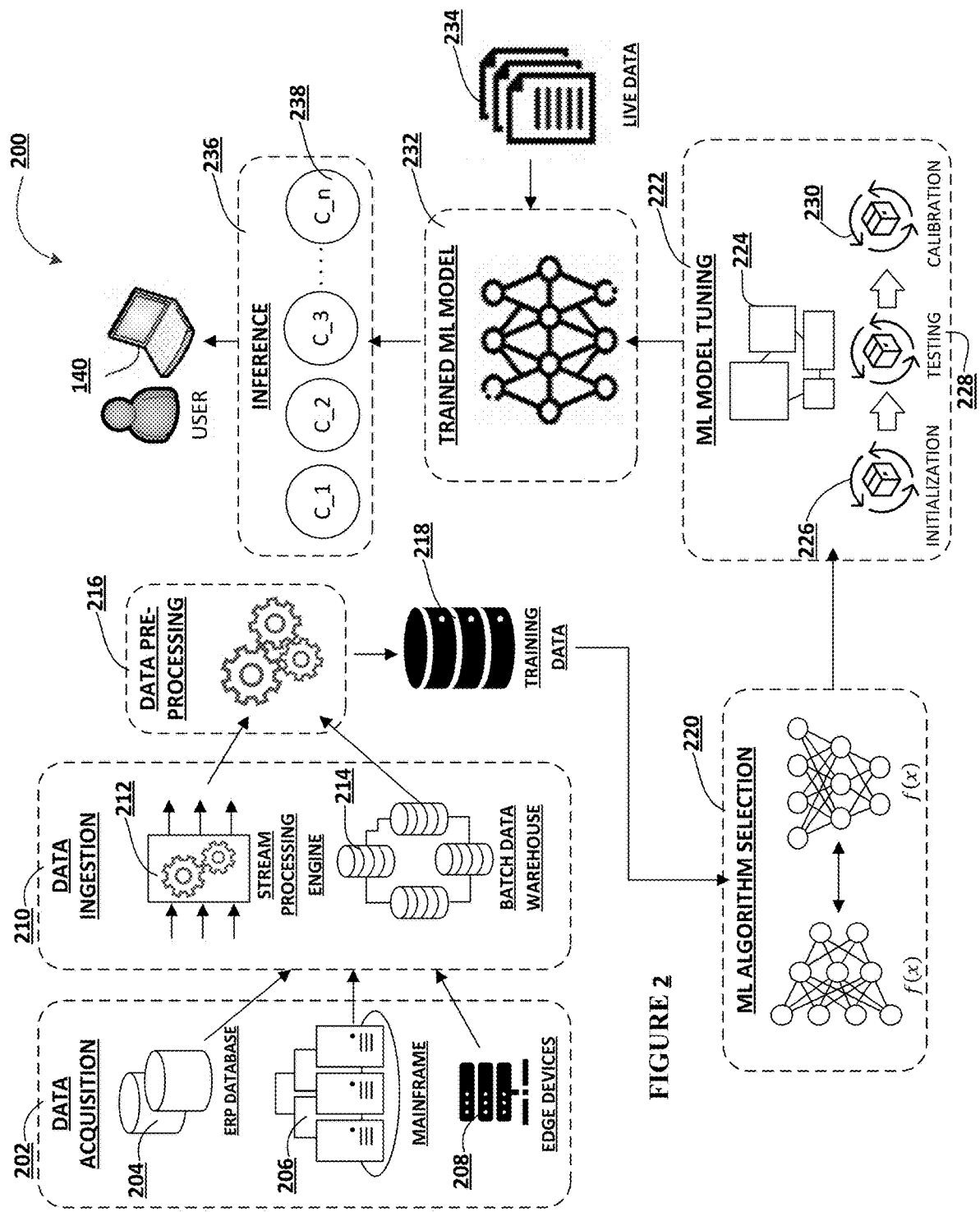
Figure 3:
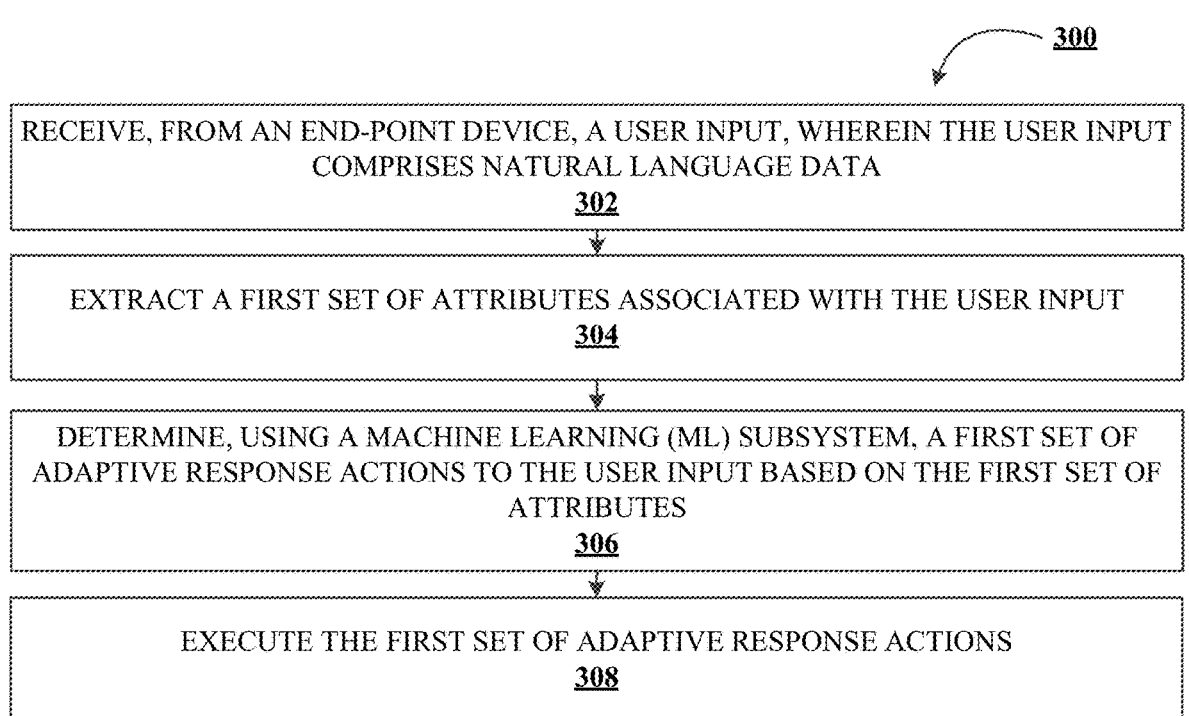
Figure 4A:
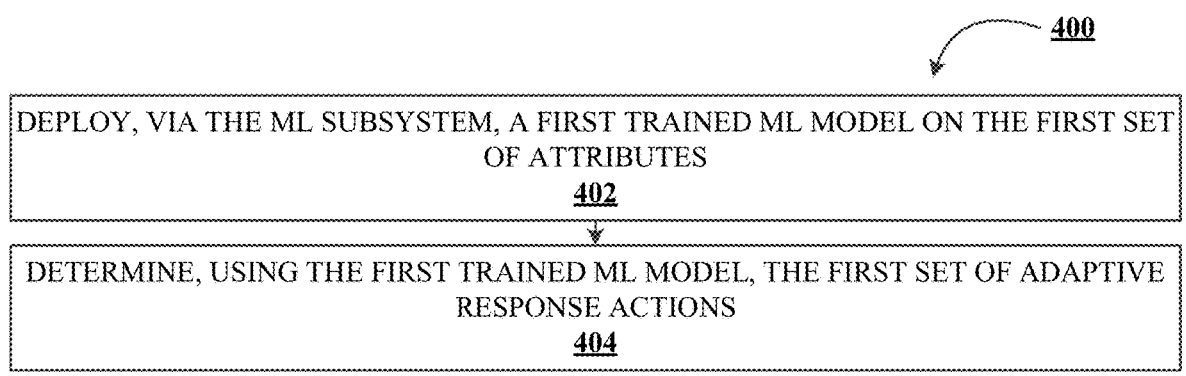
Figure 4B:
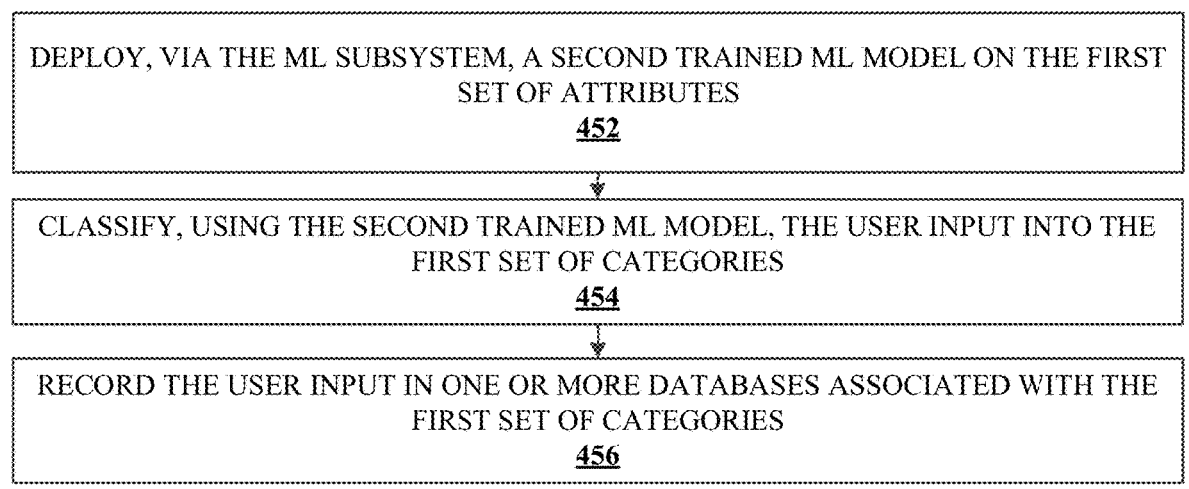

FIGS. 1A-1C illustrates technical components of an exemplary distributed computing environment for machine learning based network session interaction, in accordance with an embodiment of the disclosure;

FIG. 2 illustrates an exemplary machine learning (ML) subsystem architecture 200, in accordance with an embodiment of the disclosure;

FIG. 3 illustrates a process flow for machine learning based network session interaction, in accordance with an embodiment of the disclosure;

FIG. 4A illustrates a process flow for machine learning based determination of adaptive response actions, in accordance with an embodiment of the disclosure; and FIG. 4B illustrates a process flow for machine learning based determination of classification categories for network session interactions, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

There is a need for a system for machine learning based network session interaction categorization. Accordingly, the present disclosure, (i) Receives, from an end-point device (e.g., user input device), a user input. The user input may include any user experience feedback information associated with a network interaction (e.g., use of a product and/or service), (ii) Extracts a first set of attributes associated with the user input. The attributes may include information associated with the user, information associated with the end-point device used by the user to provide the user input, information associated with the network interaction, and/or the like. The attributes may also include content information associated with the user input, (iv) Implements natural language processing algorithms and techniques to extract content information from the user input. For example, semantic information retrieval techniques may be used to extract whether the user has had a positive or a negative experience, identify specific issues experienced by the user, identify any applicable product and/or service associated with the issue, determine whether the user input is a query or a statement, and/or the like, (v) Determines, using a machine learning (ML) subsystem, a first set of adaptive response actions to the user input based on the first set of attributes, and subsequently executing them. The first set of adaptive response actions may include a self-service portal that allows the user to address their queries, an incident management portal that allows the user to be connected to the proper personnel to address their queries, a live chat feature that allows the user to communicate with a general customer service personnel to address their experience and/or queries, and/or the like. The first set of adaptive response actions may include an end-point device modification action (e.g., modify settings in the user input device), (vi) Establishes a permissioned access connection with the end-point device, and trigger the end-point device modification action on the end-point device to modify at least one computing setting on the end-point device. The end-point device modification action may be dependent on the accessibility of the various hardware and/or software components of the end-point device as made available by the user and/or the original equipment manufacturer (OEM) of the end-point device, and (vii) Categorizes the user input into various categories for recordation to allow for efficient escalation of any issues identified in the user input to be better addressed by administrators and subject matter experts (SMEs).

What is more, the present disclosure provides a technical solution to a technical problem. As described herein, the technical problem includes appropriate and efficient response to a user experience feedback input associated with a network session interaction. The technical solution presented herein allows for the use of machine learning algorithms to determine appropriate adaptive response actions by implementing semantic analysis to identify intent and sentiment behind the user input. In addition, the technical solution presented herein allows for the use of machine learning algorithms to categorize each user input into multiple categories. Furthermore, the present disclosure requires fewer steps to achieve the solution, thus reducing the amount of computing resources, such as processing resources, storage resources, network resources, and/or the like, that are being used, provides a more accurate solution to problem, thus reducing the number of resources required to remedy any errors made due to a less accurate solution, and removes manual input and waste from the implementation of the solution, thus improving speed and efficiency of the process and conserving computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for machine learning based network session interaction 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for machine learning based network session interaction 300, in accordance with an embodiment of the disclosure. As shown in block 302, the process flow includes receiving, from an end-point device, a user input, wherein the user input comprises natural language data. In some embodiments, the user input may include any user experience feedback information associated with a network interaction with a computing environment managed by an entity. Network interaction may refer to a set of HTTP requests and responses, or other sequence of logically related network traffic, caused by a user visit to a single web page, interaction with page elements, experience with products and/or services provided by the entity, and/or the like. In one aspect, network interaction may include a deliberate action initiated by the user, via configuration, invocation, or selection, to initiate a network interaction, and/or the like. In another aspect, network interaction may include a passive action that is not directly initiated by the user. For example, an initial response in a hypermedia format that contains embedded references that may cause a browser and/or an application, depending on its capabilities and configuration, to perform a corresponding set of automated network interactions to fetch those references using additional network interactions.

Next, as shown in block 304, the process flow includes extracting a first set of attributes associated with the user input. In some embodiments, the attributes may include information associated with the user, including personal information, user status defining a user relationship with the entity, and/or the like, information associated with the end-point device used by the user to provide the user input, such as device information defining a device type, application software used to provide the user input, and/or the like, information associated with the network interaction, such as session identifier, type of network interaction, and/or the like.

In some other embodiments, the attributes may include content information associated with the user input. In embodiments where the user input is user experience feedback information, the user may provide some information detailing their experience using a product and/or service, which may include information associated with the product and/or service, information associated with the type of channel used to access the product and/or service (e.g., online, in person, virtual/augmented reality, and/or the like), information detailing the experience (positive, negative, or neutral), suggestions regarding performance improvement of the product and/or service, a query associated with the product and/or service, a general query, and/or the like. In this regard, the system may implement natural language processing algorithms and techniques to extract content information from the user input. By implementing natural language processing algorithms and techniques, the system focuses on understanding the user input. To achieve this, the system of the present invention may implement semantic information retrieval techniques such as named entity recognition, sentiment analysis, text summarization, aspect mining, textual similarity, topic modelling, and/or the like. By implementing natural language processing algorithms and techniques, the system may extract content and intent associated with the user input as attributes. For example, semantic information retrieval techniques may be used to extract whether the user has had a positive or a negative experience, identify specific issues experienced by the user, identify any applicable product and/or service associated with the issue, determine whether the user input is a query or a statement, and/or the like.

Next, as shown in block 306, the process flow includes determining, using a machine learning (ML) subsystem, a first set of adaptive response actions to the user input based on the first set of attributes. In some embodiments, the first set of adaptive response actions may include a self-service portal that allows the user to address their queries, an incident management portal that allows the user to be connected to the proper personnel to address their queries, a live chat feature that allows the user to communicate with a general customer service personnel to address their experience and/or queries, and/or the like.

In some other embodiments, the first set of adaptive response actions may include an end-point device modification action. In particular embodiments, the user may access products and/or services provided by the entity using their end-point device, which the user may also use to provide any user input to the entity related to their interaction with the products and/or services. In some cases, the user input may include queries associated with the end-point device itself. For example, the user may wish to understand specific functionalities of their end-point device to better access the products and/or services, or better understand their end-point device for a better user experience in general. In such cases, in some embodiments, the adaptive response actions may include an end-point modification action to show the user how to access the specific functionalities in the form of instruction (e.g., video showing how to access the specific functionalities). In other embodiments, the adaptive response actions may include an end-point action that modifies the end-point device of the user. In one example, the user input may include a query associated with establishing an enhanced authentication requirement on the end-point device when accessing specific functionalities of the end-point device and/or specific functionalities of the products and/or services. In another example, the user input may include a query associated with the use of the end-point device to execute an action when accessing the products and/or services. In yet another example, the user input may include a query associated with switching between various communication channels when accessing the products and/or services.

Next, as shown in block 308, the process flow includes executing the first set of adaptive response actions. In embodiments where the first set of adaptive response actions include an end-point modification action, the system may establish a permissioned access connection with the end-point device. In response, the system may trigger the end-point device modification action on the end-point device to modify at least one computing setting on the end-point device. In some embodiments, the end-point device modification action may be dependent on the accessibility of the various hardware and/or software components of the end-point device as made available by the user and/or the original equipment manufacturer (OEM) of the end-point device.

FIG. 4A illustrates a process flow for machine learning based determination of adaptive response actions 400, in accordance with an embodiment of the disclosure. As shown in block 402, the process flow includes deploying, via the ML subsystem, a first trained ML model on the first set of attributes. A trained ML model may refer to a mathematical model generated by machine learning algorithms based on training data, to make predictions or decisions without being explicitly programmed to do so. To train the ML model, the system may retrieve, from a first data repository, one or more attributes and one or more adaptive response actions executed in response to the one or more attributes. The attributes and the adaptive response actions executed in response to the attributes are then used as training data to train the ML model, and subsequently generate the first trained ML model.

Next, as shown in block 404, the process flow includes determining, using the first trained ML model, the first set of adaptive response actions. When deployed, the first trained ML model may be used to determine adaptive response actions that are likely to address the user input. In some embodiments, each adaptive response action in the first set may be associated with a likelihood of association that indicates the applicability of that particular adaptive response action in addressing the user input. In determining the first set of adaptive response actions, the system may select a set of adaptive response actions with a likelihood of association that is greater than an application threshold.

FIG. 4B illustrates a process flow for machine learning based determination of classification categories for network session interactions 450, in accordance with an embodiment of the disclosure. As shown in block 452, the process flow includes deploying, via the ML subsystem, a second trained ML model on the first set of attributes. While the first trained ML model is used to determine the adaptive response actions to the user input, the second trained ML model is used to classify the user input into various categories for recordation. In doing so, the system may allow for efficient escalation of any issues identified in the user input to be better addressed by administrators and subject matter experts (SMEs). Similar to the first trained ML model, the second trained ML model may also be trained using a feature set. To train the ML model, the system may retrieve, from a second data repository, one or more attributes and one or more categories associated with the one or more attributes. The attributes and the categories are then used as training data to train the ML model, and subsequently generate the second trained ML model.

Next, as shown in block 454, the process flow includes classifying, using the second trained ML model, the user input into the first set of categories. Similar to the first set of adaptive response actions, the system may, in some embodiments, determine the first set of categories based on a likelihood of association that indicates the applicability of that particular adaptive response action to a particular category. Next, as shown in block 456, the process flow includes recording the user input in one or more databases associated with the first set of categories.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:
1. A system for machine learning based network session interaction, the system comprising:
 a non-transitory storage device; and
 a processor coupled to the non-transitory storage device, wherein the processor is configured to:
 receive, from an end-point device, a user input associated with access to one or more resources, wherein the user input comprises natural language data;
 extract a first set of attributes associated with the user input;
 determine, using a machine learning (ML) subsystem, a first set of adaptive response actions to the user input based on the first set of attributes, wherein the first set of adaptive response actions comprises an end-point device modification action to access the one or more resources; and
 execute the first set of adaptive response actions, wherein executing the end-point modification action comprises:
 establishing permissioned access with the end-point device; and modifying, via the permissioned access, one or more hardware computing settings on the end-point device, wherein the one or more hardware computing settings comprises: (i) activation of one or more communication channels to access the one or more resources, wherein each resource is accessed via a dedicated corresponding communication channel, and (ii) activation of one or more authentication sensors to access the one or more resources, wherein each resource is associated with a corresponding authentication level, wherein each authentication level defines a required number of authentication sensors used to provide authentication credentials.

2. The system of claim 1, wherein, in determining the first set of adaptive response actions, the processor is further configured to:
 deploy, via the ML subsystem, a first trained ML model on the first set of attributes; and
 determine, using the first trained ML model, the first set of adaptive response actions.

3. The system of claim 2, wherein the processor is further configured to:
 retrieve, from a first data repository, one or more attributes and one or more adaptive response actions executed in response to the one or more attributes;
 generate a first feature set comprising the one or more attributes and the one or more adaptive response actions; and
 train, using the ML subsystem, an ML model using the first feature set to generate the first trained ML model.

4. The system of claim 1, wherein, in executing the end-point device modification action, the processor is further configured to:
 establish a permissioned access with the end-point device; and
 trigger the end-point device modification action on the end-point device.

5. The system of claim 1, wherein the processor is further configured to:
 determine, using the ML subsystem, a first set of categories for the user input based on at least the first set of attributes; and
 classify the user input into the first set of categories.

6. The system of claim 5, wherein, in determining the first set of categories of the user input, the processor is further configured to:
 deploy, via the ML subsystem, a second trained ML model on the first set of attributes;
 classify, using the second trained ML model, the user input into the first set of categories; and
 record the user input in one or more databases associated with the first set of categories.

7. The system of claim 6, wherein the processor is further configured to:
 receive, from a second data repository, one or more attributes and one or more categories associated with the one or more attributes;
 generate a second feature set comprising the one or more attributes and the one or more categories; and
 train, using the ML subsystem, an ML model using the second feature set to generate the second trained ML model.

8. The system of claim 1, wherein the user input comprises user experience feedback information associated with a network interaction with a computing environment managed by an entity.

9. A computer program product for machine learning based network session interaction, the computer program product comprising a non-transitory computer-readable medium comprising code causing an apparatus to:
 receive, from an end-point device, a user input associated with access to one or more resources, wherein the user input comprises natural language data;
 extract a first set of attributes associated with the user input;
 determine, using a machine learning (ML) subsystem, a first set of adaptive response actions to the user input based on the first set of attributes, wherein the first set of adaptive response actions comprises an end-point device modification action to access the one or more resources; and
 execute the first set of adaptive response actions, wherein executing the end-point modification action comprises:
  establishing permissioned access with the end-point device; and
  modifying, via the permissioned access, one or more hardware computing settings on the end-point device, wherein the one or more hardware computing settings comprises: (i) activation of one or more communication channels to access the one or more resources, wherein each resource is accessed via a dedicated corresponding communication channel, and (ii) activation of one or more authentication sensors to access the one or more resources, wherein each resource is associated with a corresponding authentication level, wherein each authentication level defines a required number of authentication sensors used to provide authentication credentials.

10. The computer program product of claim 9, wherein, in determining the first set of adaptive response actions, the apparatus is further configured to:
 deploy, via the ML subsystem, a first trained ML model on the first set of attributes; and
 determine, using the first trained ML model, the first set of adaptive response actions.

11. The computer program product of claim 10, wherein the apparatus is further configured to:
 retrieve, from a first data repository, one or more attributes and one or more adaptive response actions executed in response to the one or more attributes;
 generate a first feature set comprising the one or more attributes and the one or more adaptive response actions; and
 train, using the ML subsystem, an ML model using the first feature set to generate the first trained ML model.

12. The computer program product of claim 9, wherein, in executing the end-point device modification action, the apparatus is further configured to:
 establish a permissioned access with the end-point device; and
 trigger the end-point device modification action on the end-point device to modify at least one computing setting on the end-point device.

13. The computer program product of claim 9, wherein the apparatus is further configured to:
 determine, using the ML subsystem, a first set of categories for the user input based on at least the first set of attributes; and
 classify the user input into the first set of categories.

14. The computer program product of claim 13, wherein, in determining the first set of categories of the user input, the apparatus is further configured to:

deploy, via the ML subsystem, a second trained ML model on the first set of attributes;

classify, using the second trained ML model, the user input into the first set of categories; and record the user input in one or more databases associated with the first set of categories.

15. The computer program product of claim 14, wherein the apparatus is further configured to:

receive, from a second data repository, one or more attributes and one or more categories associated with the one or more attributes;

generate a second feature set comprising the one or more attributes and the one or more categories; and train, using the ML subsystem, an ML model using the second feature set to generate the second trained ML model.

16. A method for machine learning based network session interaction, the method comprising:

receiving, from an end-point device, a user input associated with access to one or more resources, wherein the user input comprises natural language data;

extracting a first set of attributes associated with the user input;

determining, using a machine learning (ML) subsystem, a first set of adaptive response actions to the user input based on the first set of attributes, wherein the first set of adaptive response actions comprises an end-point device modification action to access the one or more resources; and executing the first set of adaptive response actions, wherein executing the end-point modification action comprises:

establishing permissioned access with the end-point device; and modifying, via the permissioned access, one or more hardware computing settings on the end-point device, wherein the one or more hardware computing settings comprises: (i) activation of one or more communication channels to access the one or more resources, wherein each resource is accessed via a dedicated corresponding communication channel, and (ii) activation of one or more authentication sensors to access the one or more resources, wherein each resource is associated with a corresponding authentication level, wherein each authentication level defines a required number of authentication sensors used to provide authentication credentials.

* * * * *